(No Model.)
J. GIGER.
PORTABLE FENCE.
No. 251,569. Patented Dec. 27, 1881.
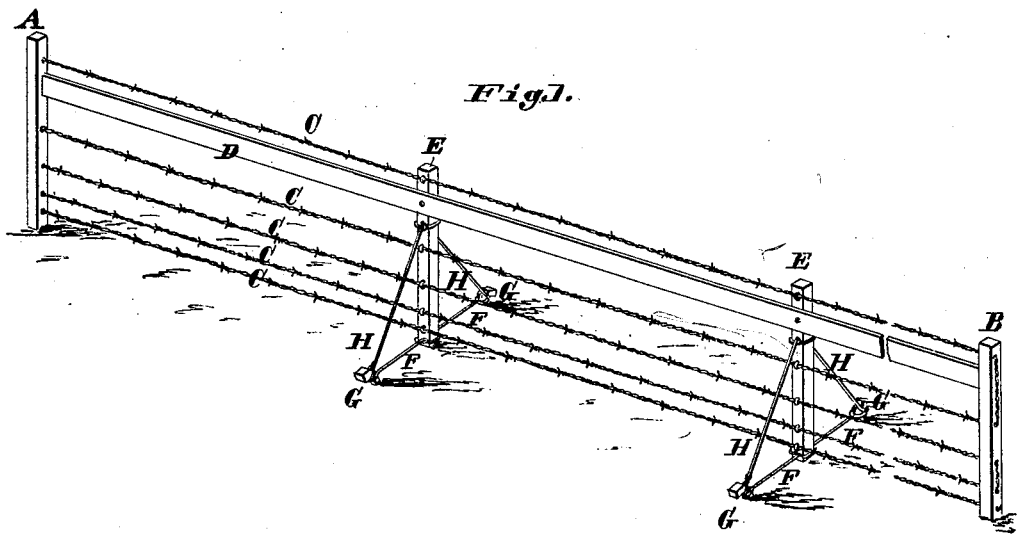
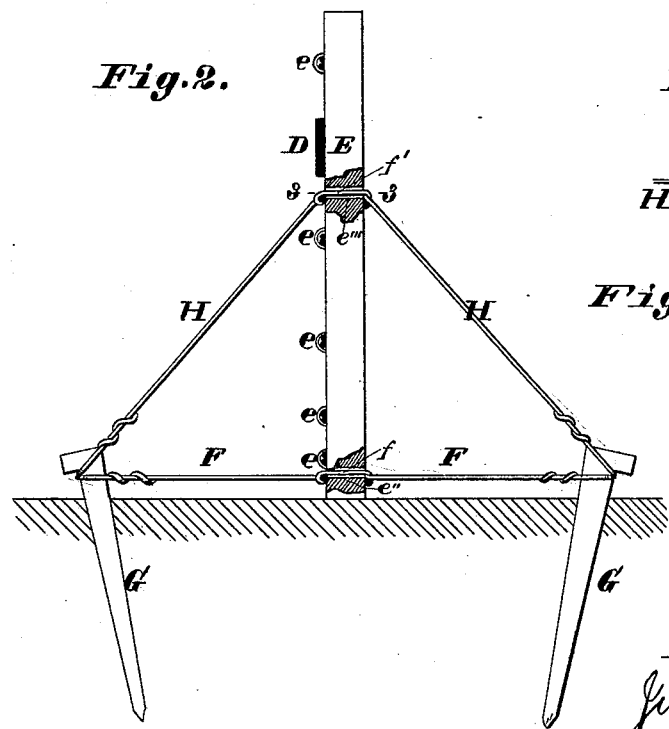
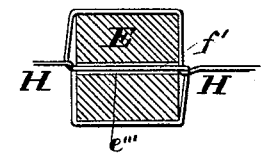
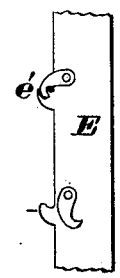
Attest:
Charles Pickles
Geo. H. Knight
Inventor:
Julius Giger
By Knight Bro.
Attys

UNITED STATES PATENT OFFICE.

JULIUS GIGER, OF ALHAMBRA, ILLINOIS.

PORTABLE FENCE.

SPECIFICATION forming part of Letters Patent No. 251,569, dated December 27, 1881.

Application filed September 13, 1881. (No model.)

*To all whom it may concern:*

Be it known that I, JULIUS GIGER, of Alhambra, in the county of Madison and State of Illinois, have invented a certain new and useful Improvement in Portable Fences, of which the following is a full, clear, and exact description, reference being had to the accompanying drawings, forming part of this specification.

My invention consists in the hereinafter-described manner of securing the intermediate posts of a portable fence to the ground when in use.

In the drawings, Figure 1 is a perspective view of my improved fence. Fig. 2 is an end elevation of same. Fig. 3 is an enlarged horizontal section, taken on line 3 3, Fig. 2, of one of the posts, showing preferred manner of securing the post and wire together to keep the former from moving vertically and laterally. Fig. 4 is a detail enlarged side elevation of an iron post, showing my manner of securing the fence-wires thereto.

A B are the stretching-posts, which are placed in the ground in the ordinary manner. They are placed at intervals of one hundred feet (more or less) apart. C are the wires, and D the signal-board, of the fence.

E are the intermediate posts, of which any desired number are placed between the stretching-posts. The mode of attaching these posts to the ground constitutes my invention.

F is a horizontal wire, secured at or near its middle, in the form of a double twist, to the post E, the middle portion, $f$, of the wire passing through the perforation $e''$ in the post, as shown in Figs. 2 and 3, and having its ends looped to receive stakes G, which are driven into the ground, as shown in Figs. 1 and 2.

H is a guy-wire, secured to the post near its top and beneath the signal-board D, in the same manner as the horizontal wire at bottom, by passing the middle portion, $f'$, through the perforation $e'''$, and having its ends looped and held to the ground by the stakes G. By these triangular braces the intermediate posts are securely held from lateral or vertical movement, and they can be readily detached from the ground for removal of the fence. The fence-wires are secured to these posts by staples $e$.

In Fig. 4 is shown a metallic post having hooks or catches $e'$ for holding the fence-wires.

The stretching-posts are not an absolute necessity in my fence, except on very uneven ground, or where turns are made in the fence.

Having thus described my invention, the following is what I claim as new therein and desire to secure by Letters Patent:

The combination of post E, having perforations $e''$ and $e'''$, horizontal base-wire F, having a double twist, looped ends on opposite sides of the post, and whose middle portion, $f$, is passed through the post, guy-wire H, having a double twist, looped ends, and whose middle portion, $f'$, is passed through the post beneath the signal-board, and the stakes G G, all constructed and arranged substantially as and for the purpose set forth.

JULIUS GIGER.

Witnesses:
DANIEL GIGER,
J. A. LEEF.